United States Patent
Matsumoto et al.

(10) Patent No.: US 9,205,891 B2
(45) Date of Patent: Dec. 8, 2015

(54) TRANSOM-STERN-TYPE STERN SHAPE OF VESSEL

(75) Inventors: Daisuke Matsumoto, Tokyo (JP); Shingen Takeda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 163 days.

(21) Appl. No.: 13/877,357

(22) PCT Filed: Oct. 20, 2011

(86) PCT No.: PCT/JP2011/074200
§ 371 (c)(1),
(2), (4) Date: Apr. 2, 2013

(87) PCT Pub. No.: WO2012/073614
PCT Pub. Date: Jun. 7, 2012

(65) Prior Publication Data
US 2013/0186318 A1    Jul. 25, 2013

(30) Foreign Application Priority Data

Dec. 2, 2010  (JP) ................. 2010-269504
Dec. 2, 2010  (JP) ................. 2010-269505

(51) Int. Cl.
*B63B 1/00*  (2006.01)
*B63B 1/08*  (2006.01)
*B63B 1/40*  (2006.01)

(52) U.S. Cl.
CPC ... *B63B 1/08* (2013.01); *B63B 1/40* (2013.01); *Y02T 70/125* (2013.01); *Y02T 70/128* (2013.01)

(58) Field of Classification Search
CPC ............. B63B 1/08; B63B 1/40; B63B 3/40; Y02T 70/128; Y02T 70/127; Y02T 70/125; B63H 5/16
USPC ................ 114/56.1, 57, 61.26, 61.32, 62, 63
See application file for complete search history.

(56) References Cited

U.S. PATENT DOCUMENTS 1,717,286 A * 6/1929 Ward ............................. 114/163
4,363,630 A * 12/1982 Di Vigano ....................... 440/69
(Continued)

FOREIGN PATENT DOCUMENTS

CN          1072146       5/1993
CN          2377170       5/2000
(Continued)

OTHER PUBLICATIONS

International Search Report issued Jan. 24, 2012 in International (PCT) Application No. PCT/JP2011/074200.
(Continued)

*Primary Examiner* — Anthony Wiest
(74) *Attorney, Agent, or Firm* — Wenderoth, Lind & Ponack, L.L.P.

(57) ABSTRACT

In a vessel, a first hull bottom (21) formed with a hull bottom (13) located at a centerline (C) of a hull (11) in a width direction inclined upward in a backward direction and a second hull bottom (22) formed to make an angle equal to or larger than an angle parallel to a design draft (S) and equal to or smaller than an angle of a backward extending line from the first hull bottom (21) continuously to the first hull bottom (21) at a position moved forward by a predetermined distance L set in advance from a stern end (12a) are provided, by which the vessel resistance can be reduced at the time of navigation.

6 Claims, 8 Drawing Sheets

(56) References Cited

U.S. PATENT DOCUMENTS

| | | | | |
|---|---|---|---|---|
| 4,371,350 A | * | 2/1983 | Kruppa et al. | 440/69 |
| 8,028,636 B2 | * | 10/2011 | Takashima et al. | 114/57 |
| 2009/0320731 A1 | * | 12/2009 | Takashima et al. | 114/57 |

FOREIGN PATENT DOCUMENTS

| | | |
|---|---|---|
| EP | 1 211 171 | 6/2002 |
| JP | 49-111389 | 10/1974 |
| JP | 59-73384 | 4/1984 |
| JP | 61-171683 | 8/1986 |
| JP | 8-133172 | 5/1996 |
| JP | 3490392 | 1/2004 |
| JP | 2010-18242 | 1/2010 |
| KR | 10-0522962 | 10/2005 |
| WO | WO 2008099672 A1 * | 8/2008 |

OTHER PUBLICATIONS

Written Opinion of the International Searching Authority mailed Jan. 24, 2012 in International (PCT) Application No. PCT/JP2011/074200.

Korean Office Action issued Jun. 13, 2014 in corresponding Korean Patent Application No. 10-2013-7010475 with English translation.

Japanese Office Action issued Dec. 17, 2013 in corresponding Japanese Patent Application No. 2010-269504 with partial English translation.

Chinese Office Action issued Feb. 12, 2015 in corresponding Chinese Application No. 201180051286.0 (with English translation).

Japanese Office Action issued Mar. 31, 2015 in corresponding Japanese Application No. 2010-269505 (with partial English translation).

* cited by examiner

TRANSOM-STERN-TYPE STERN SHAPE OF VESSEL

FIELD

The present invention relates to a general vessel such as a passenger vessel, a ferry, a container vessel, a RO-RO vessel (Roll-on/Roll-off Vessel), and a PCC (Pure Car Carrier) and a PCTC (Pure Car/Truck Carrier) as an automobile carrier.

BACKGROUND

In a vessel used as a high-speed craft of a slim type, such as a passenger vessel and a ferry, the current flow increases at the stern when navigating in a sea speed range, which increases a negative pressure at the stern, and immersion of the stern increases accordingly. Therefore, considering from the viewpoint of the vessel resistance, it becomes in a state where the stern is exaggerated, which sharply increases the resistance of the whole vessel. This tendency is particularly prominent in a high-speed craft in which the Froude number is equal to or larger than a predetermined number (for example, 0.3).

A technique for solving such a problem has been described in Patent Literature 1 mentioned below. A transom-stern-type stern shape described in Patent Literature 1 is a hull bottom shape along the vessel centerline of a commercial vessel having a transom stern, in which an inflection point is provided at a predetermined distance from a stern end to generate a change of a flow field accompanying a change of the current speed, and a hull bottom surface inclined downward from the inflection point to the stern end is provided to generate a downward flow to form an accelerated flow region backward of the inflection point, thereby reducing the stern wave.

CITATION LIST

Patent Literature

Japanese Patent No. 3490392

SUMMARY

Technical Problem

In the conventional transom-stern-type stern shape described above, it is possible to reduce the stern wave by providing an inflection point at a predetermined distance from the stern end and providing the hull bottom surface inclined downward from the inflection point to the stern end. However, vessels of recent years are required to have even higher navigation capability and operation efficiency. As a result, reduction of vessel resistance at the time of navigation has become important, and more reduction of the vessel resistance has been desired.

The present invention has been achieved to solve the above problem, and an object of the present invention is to provide a vessel, with which it is possible to reduce the vessel resistance at the time of navigation.

Solution to Problem

According to an aspect of the present invention, a vessel includes: a first hull bottom formed with a hull bottom located at a centerline of a hull in a width direction inclined upward in a backward direction; and a second hull bottom formed to make an angle equal to or larger than an angle parallel to a design draft and equal to or smaller than an angle of a backward extending line from the first hull bottom continuously to the first hull bottom at a position moved forward by a predetermined distance set in advance from a stern end.

Therefore, when the vessel is navigating, the water current flowing along the stern flows backward along the first hull bottom, and then flows to the second hull bottom, by which the hull surface pressure is increased, and therefore the stern is pushed up by the hull surface pressure. Accordingly, the immersion of the stern is suppressed, and it is possible to reduce the vessel resistance. Furthermore, because the second hull bottom is not inclined downward, the stern end is hardly immersed in the water, and therefore it is also possible to reduce the vessel resistance in this aspect by suppressing generation of a stern wave by the second hull bottom.

Advantageously, in the vessel, the second hull bottom is set equal to or larger than 0 degrees and equal to or smaller than 20 degrees with respect to a design draft.

Therefore, by setting the angle of the second hull bottom to an appropriate angle with respect to the design draft, it is possible to effectively reduce the vessel resistance with a push-up effect of the stern by the hull surface pressure and a suppression effect of generation of a stern wave by the immersion of the stern end of the second hull bottom.

Advantageously, in the vessel, the first hull bottom has a planar shape or a smooth curved shape, and the second hull bottom has a shape that is level in a longitudinal direction in parallel to a design draft.

Therefore, it is possible to further reduce the vessel resistance by forming the entire hull bottom in a smooth shape.

Advantageously, in the vessel, a continuous portion between the first hull bottom and the second hull bottom makes an inflection position to generate a change of a flow field accompanying a change of a current speed.

Therefore, it is possible to exert the push-up effect of the stern by the hull surface pressure by increasing the hull surface pressure on a forward side of the inflection position.

Advantageously, in the vessel, a recessed portion is provided in the hull at an area facing the second hull bottom in an upward direction.

Therefore, it is possible to reduce the vessel resistance and to reduce the manufacturing cost at the same time without degrading the propulsive performance of the hull.

Advantageously, in the vessel, a stern end of a hull is configured by connecting each bottom portion of left and right side walls and each edge portion of a hull bottom in a width direction with a curved portion, and a width of a level portion in the hull bottom is set equal to or larger than 60% of a width of the stern end.

Therefore, when the vessel is navigating, the water current flowing along the stern flows backward along the hull bottom, and the hull surface pressure is increased due to the flow to a level portion, and the stern is pushed up by the hull surface pressure. Accordingly, the immersion of the stern is suppressed, and it is possible to reduce the vessel resistance.

Advantageously, in the vessel, the width of the level portion in the hull bottom is set equal to or larger than 60% and equal to or smaller than 95% of the width of the stern end of the hull.

Therefore, it is possible to further reduce the vessel resistance by setting the width of the level portion to an optimum value.

Advantageously, in the vessel, the width of the level portion is set to a predetermined ratio of a width of the hull in the second hull bottom.

Therefore, the water current flowing along the stern flows to the level portion of the second hull bottom, by which the hull surface pressure is increased, and the stern is pushed up by the hull surface pressure. Accordingly, the immersion of the stern is suppressed, and it is possible to reduce the vessel resistance effectively.

Advantageous Effects of Invention

According to the vessel of the present invention, because the first hull bottom that is inclined upward in the backward direction and the second hull bottom formed to make an angle equal to or larger than an angle parallel to the design draft and equal to or smaller than an angle of the backward extending line from the first hull bottom are provided, it is possible to reduce the vessel resistance at the time of navigation.

DESCRIPTION OF EMBODIMENTS

Exemplary embodiments of a vessel according to the present invention will be explained below in detail with reference to the accompanying drawings. The present invention is not limited to the embodiments, and when there are plural embodiments, the present invention also includes combinations of these embodiments.

First Embodiment

Figure 1:
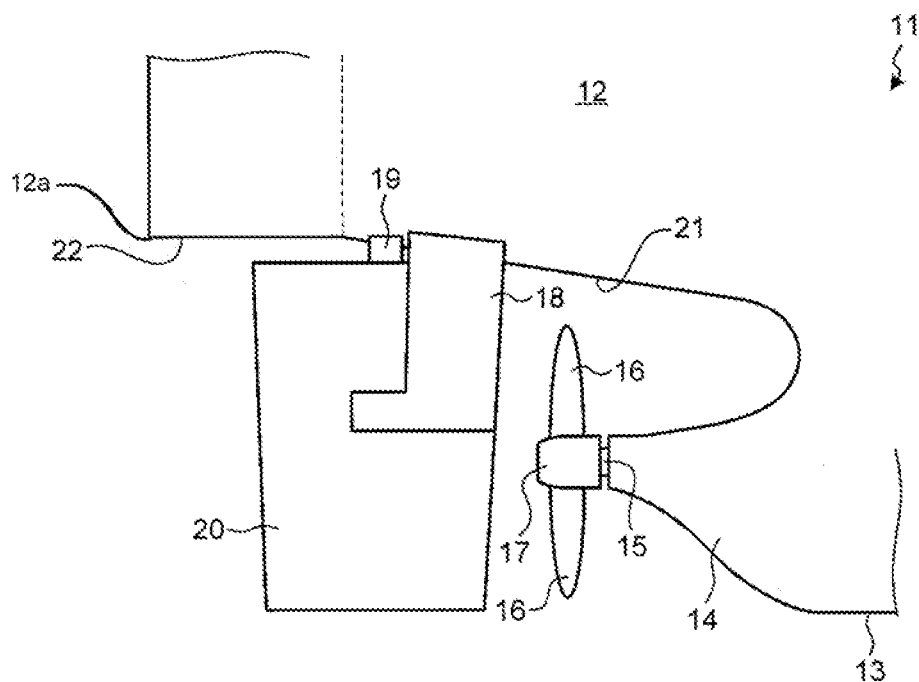
FIG. 1 is a side view of a stern of a vessel according to a first embodiment of the present invention.
Figure 2:
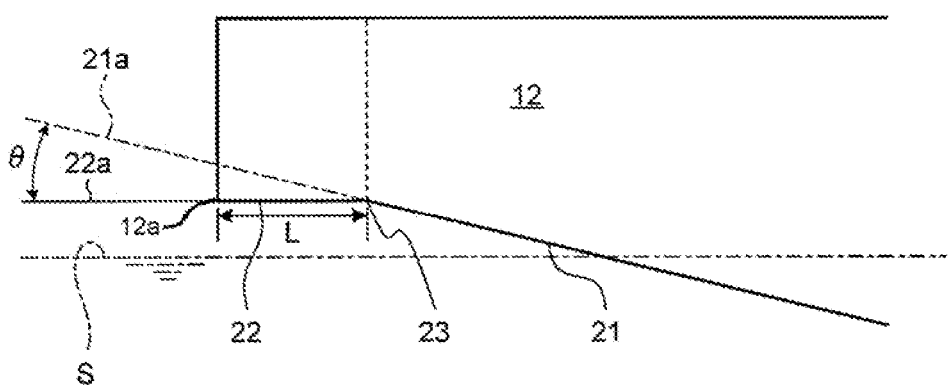
FIG. 2 is a side view of a stern shape of the vessel according to the first embodiment.
Figure 3:
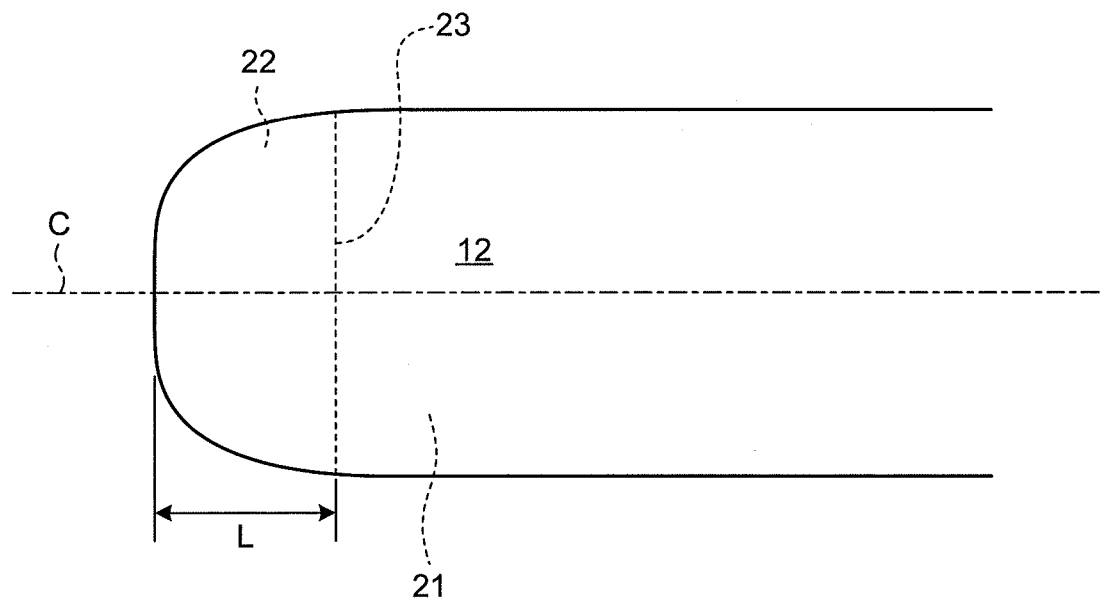
FIG. 3 is a plan view of the stern shape of the vessel according to the first embodiment.
Figure 4:
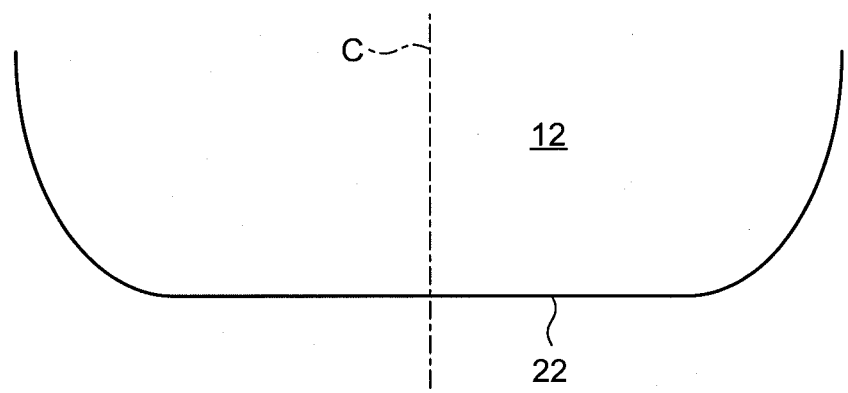
FIG. 4 is a front view of the stern shape of the vessel according to the first embodiment.
Figure 5:
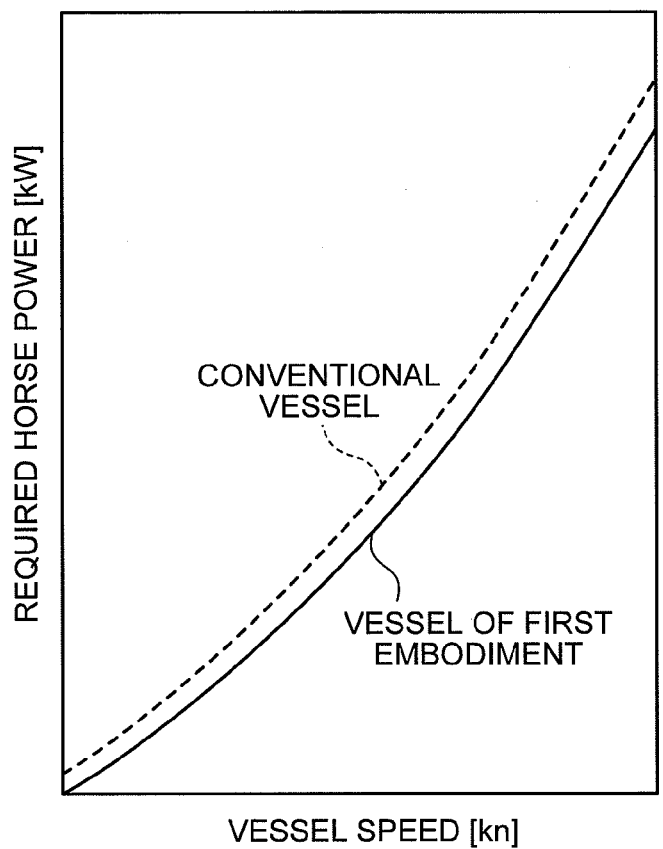
FIG. 5 is a graph of required horse power with respect to a vessel speed.

FIG. 1 is a side view of a stern of a vessel according to a first embodiment of the present invention, FIG. 2 is a side view of a stern shape of the vessel according to the first embodiment, FIG. 3 is a plan view of the stern shape of the vessel according to the first embodiment, FIG. 4 is a front view of the stern shape of the vessel according to the first embodiment, and FIG. 5 is a graph of required horse power with respect to a vessel speed.

In the vessel according to the first embodiment, as shown in FIG. 1, a stern 12 of a hull 11 is configured such that a hull bottom 13 that is formed nearly level is extended backward, where a bearing unit 14 is formed. A main shaft 15 is rotatably supported by the bearing unit 14, and a propeller boss 17 including a screw propeller 16 is connected to a back end portion of the main shaft 15 in a fixed manner.

The hull bottom 13 is continuously formed above the propeller boss 17 in a smooth manner, a rudder horn 18 is fixed backward of the propeller boss 17, and a rudder 20 is supported by a rudderpost 19 that is installed on the stern 12 and the rudder horn 18.

In the vessel according to the first embodiment configured as described above, the stern 12 includes a first hull bottom 21 formed with the hull bottom located at the centerline of the hull 11 in the width direction inclined upward in the backward direction and a second hull bottom 22 formed to make an angle equal to or larger than an angle parallel to a design draft S and equal to or smaller than an angle of a backward extending line from the first hull bottom 21 continuously to the first hull bottom 21 at a position moved forward by a predetermined distance set in advance from a stern end 12a.

In this case, it is preferable to set the angle of the second hull bottom 22 equal to or larger than 0 degrees and equal to or smaller than 20 degrees with respect to the design draft S. Furthermore, it is preferable that the first hull bottom 21 have a planar shape or a smooth curved shape. On the other hand, the second hull bottom 22 has a shape that is level backward and forward in parallel to the design draft S. In addition, a continuous portion between the first hull bottom 21 and the second hull bottom 22 makes an inflection position to generate a change of a flow field accompanying a change of the current speed.

That is, the vessel according to the first embodiment is a commercial vessel including a transom stern, in which an inflection point (inflection position) to generate a change of a flow field accompanying a change of the current speed is provided at a position moved forward by a predetermined distance set in advance from the stern end 12a. The first hull bottom 21 is then formed while being inclined upward in the backward direction with a planar shape or a smooth curved shape such that an area in which the current speed is slow is formed forward from the inflection point. On the other hand, the second hull bottom 22 is formed at a position away from the stern end 12a by a predetermined distance being inclined downward in the backward direction to generate a downward flow to form an area in which the water flow is accelerated backward of the inflection point.

Specifically, as shown in FIGS. 2 to 4, the stern 12 makes a symmetric form with respect to a centerline C of the hull 11 in the width direction. The first hull bottom 21 is a plane or a curved surface inclined upward by a predetermined angle θ with respect to the design draft S in the backward direction from the hull bottom 13. The second hull bottom 22 is a level plane parallel to the design draft S, being connected to the first hull bottom 21 at an inflection position 23 that is moved forward by a predetermined distance L set in advance from the stern end 12a.

The second hull bottom 22 is formed within an angle made by a level line 22a that is parallel to the design draft S and an extended line 21a that is extended backward from the first hull bottom 21, which is an inclination angle in the backward direction equal to or larger than 0 degrees on the upper side from the level line 22a and an inclination angle on the lower side from the extended line 21a. In this case, it is preferable to set the predetermined angle θ in such a manner that the upward inclination angle in the backward direction with respect to the design draft S is equal to or smaller than 20 degrees. The inflection position 23 is not necessarily to connect the first hull bottom 21 and the second hull bottom 22 with a predetermined angle, but it suffices that the inflection position 23 connects them in a smooth manner with a predetermined curved surface in the longitudinal direction. Furthermore, when the first hull bottom 21 is not a planar shape but is a smooth curved shape, the extended line 21a from the first hull bottom 21 is a tangential line of the first hull bottom 21 at the inflection position 23.

The design draft S is a draft in a state where a load of a predetermined weight is loaded on the hull 11, and a full load draft is a draft in a state where a load of the maximum weight that is tolerable by the structural strength is loaded on the hull 11. Therefore, the design draft S is set to allow a margin on the full load draft.

Therefore, when the vessel is navigating, the water current flowing along the stern 12 is deflected in the downward direction at the rear side of the inflection position 23, by which the stern 12 is pushed up in the upward direction via the first hull bottom 21, so that the immersion of the stern 12 is reduced. As a result, it is possible to reduce the vessel resistance generated due to the immersion of the stern 12 considerably, which leads to an improvement of fuel efficiency.

Conventionally, because a hull bottom inclined downward in the backward direction is provided, in an area in which the vessel speed is slow, the stern end 12a is immersed in the water. As a result, the resistance is increased considerably due to a wave generated at the stern. However, in the vessel according to the first embodiment, it is possible to secure a clearance with the water surface by leveling the second hull bottom 22, so that the stern end 12a is never immersed in the water across the whole area from the high-speed area to the low-speed area, thereby reducing the vessel resistance.

That is, when the vessel is navigating, the water current flowing along the stern 12 flows from the first hull bottom 21 that is inclined upward to the inflection position 23 side, and then flows from the inflection position 23 to the second hull bottom 22 that makes a level plane, by which the hull surface pressure is increased and the stern 12 is pushed up by the hull surface pressure. As a result, the immersion of the stern 12 is suppressed, and the vessel resistance is reduced.

In this case, if the load of the maximum weight is loaded on the vessel, the draft can be elevated up to the full load draft, and then the stern end 12a can be immersed in the water. Conventionally, because the stern end 12a is inclined downward, the stern end 12a is easily immersed in the water, resulting in a considerable increase of the resistance because an excessive stern wave is generated from the stern end 12a that is immersed in the water. On the other hand, in the vessel according to the first embodiment, because the second hull bottom 22 makes a level plane, the second hull bottom 22 is hardly immersed in the water, and even if it is immersed in the water, the amount of immersion is small. Therefore, generation of a stern wave is reduced, and an increase of the resistance is suppressed accordingly.

Therefore, as shown in FIG. 5, the vessel according to the first embodiment (solid line) having a planar (or inclined upward) stern bottom can reduce the required horse power with respect to the vessel speed, compared to a conventional vessel (dotted line) having a stern bottom inclined downward.

In this manner, the vessel according to the first embodiment includes the first hull bottom 21 formed with the hull bottom 13 located at the centerline C of the hull 11 in the width direction inclined upward in the backward direction and the second hull bottom 22 formed continuously to the first hull bottom 21, being parallel to the design draft S, at a position moved forward by the predetermined distance L set in advance from the stern end 12a.

Therefore, when the vessel is navigating, the water current flowing along the stern 12 flows in the backward direction along the first hull bottom 21, and then flows to the second hull bottom 22, by which the hull surface pressure is increased and the stern 12 is pushed up by the hull surface pressure. As a result, the immersion of the stern 12 is suppressed, and it is possible to reduce the vessel resistance. Furthermore, because the second hull bottom 22 is not inclined downward in the backward direction, the stern end 12a is hardly immersed in the water, and therefore it is also possible to reduce the vessel resistance in this aspect by suppressing generation of a stern wave by the second hull bottom 22.

Furthermore, in the vessel according to the first embodiment, the angle of the second hull bottom 22 is set equal to or larger than 0 degrees and equal to or smaller than 20 degrees with respect to the design draft S. Therefore, by setting the angle of the second hull bottom 22 to an appropriate angle with respect to the design draft S, it is possible to effectively reduce the vessel resistance with a push-up effect of the stern 12 by the hull surface pressure and a suppression effect of generation of a stern wave by the immersion of the stern end 12a of the second hull bottom 22.

Moreover, in the vessel according to the first embodiment, the first hull bottom 21 is formed in a planar shape or a curved shape, and the second hull bottom 22 is formed in a level shape in the longitudinal direction parallel to the design draft S. Therefore, by forming the entire hull bottom in a smooth shape, it is possible to further reduce the vessel resistance.

In addition, in the vessel according to the first embodiment, the continuous portion between the first hull bottom 21 and the second hull bottom 22 makes the inflection position 23 to generate a change of a flow field accompanying a change of the current speed. Therefore, by increasing the hull surface pressure on the forward side of the inflection position 23, it is possible to appropriately exert the push-up effect of the stern 12 by the hull surface pressure.

Second Embodiment

Figure 6:
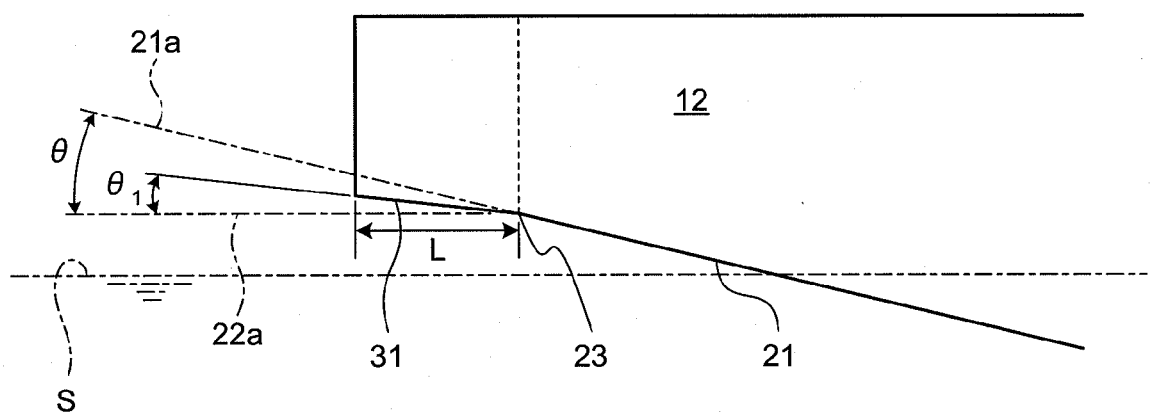
FIG. 6 is a side view of a stern shape of a vessel according to a second embodiment of the present invention.
Figure 7:
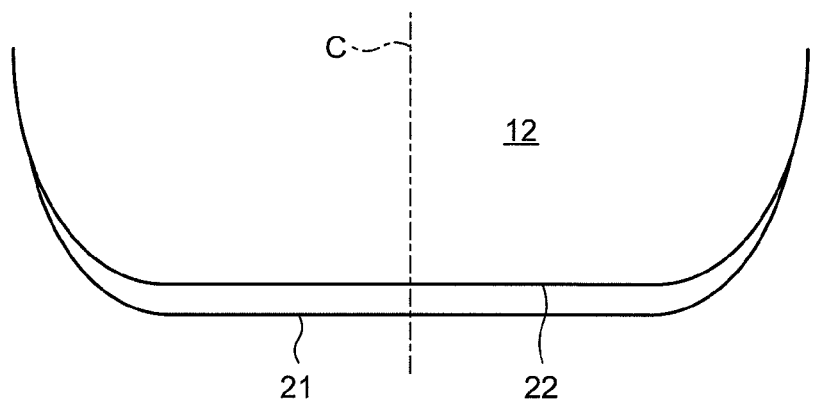
FIG. 7 is a front view of the stern shape of the vessel according to the second embodiment.

FIG. 6 is a side view of a stern shape of a vessel according to a second embodiment of the present invention, and FIG. 7 is a front view of the stern shape of the vessel according to the second embodiment. Elements having functions that are identical to those described in the above embodiment are denoted by like reference signs and detailed explanations thereof will be omitted.

In the vessel according to the second embodiment, as shown in FIGS. 6 and 7, the stern 12 includes the first hull bottom 21 formed with the hull bottom located at the centerline of the hull 11 in the width direction inclined upward in the backward direction and a second hull bottom 31 formed to make an angle equal to or larger than an angle parallel to the design draft S and equal to or smaller than an angle of the backward extending line from the first hull bottom 21 continuously to the first hull bottom 21 at a position moved forward by a predetermined distance set in advance from the stern end 12a.

Specifically, the first hull bottom 21 is a plane or a curved surface inclined upward by the predetermined angle θ with respect to the design draft S in the backward direction from the hull bottom 13. The second hull bottom 31 is a plane connected to the first hull bottom 21 at the inflection position 23 that is moved forward by the predetermined distance L that is set in advance from the stern end 12a, being inclined upward by a predetermined angle $\theta_1$ with respect to the design draft S. In this case, the predetermined angle $\theta_1$ of the second hull bottom 31 is smaller than the predetermined angle $\theta$ of the first hull bottom 21.

That is, the second hull bottom 31 is a plane having the predetermined angle $\theta_1$ with respect to the level line 22a within an angle made by the level line 22a that is parallel to the design draft S and the extended line 21a that is extended backward from the first hull bottom 21.

Therefore, when the vessel is navigating, the water current flowing along the stern 12 flows from the first hull bottom 21 that is inclined upward to the inflection position 23 side, and then flows from the inflection position 23 to the second hull bottom 31 that is inclined upward. In this case, because the predetermined angle $\theta_1$ of the second hull bottom 31 is smaller than the predetermined angle $\theta$ of the first hull bottom 21, the hull surface pressure is increased and the stern 12 is pushed up by the hull surface pressure. As a result, the immersion of the stern 12 is suppressed, and the vessel resistance is reduced.

If a load of the maximum weight is loaded on the vessel, the draft is elevated up to the full load draft, and then the stern end 12a can be immersed in the water. However, because the second hull bottom 31 is inclined upward from the level plane, the stern end 12a of the second hull bottom 31 is hardly immersed in the water, and even if it is immersed in the water, the amount of immersion is small. Therefore, generation of a stern wave is reduced, and an increase of the resistance is suppressed accordingly.

In this manner, the vessel according to the second embodiment includes the first hull bottom 21 formed with the hull bottom 13 located at the centerline C of the hull 11 in the width direction inclined upward in the backward direction and the second hull bottom 31 formed to make the predetermined angle $\theta_1$ equal to or smaller than the angle of the backward extending line from the first hull bottom 21 continuously to the first hull bottom 21 at a position moved forward by the predetermined distance L set in advance from the stern end 12a.

Therefore, when the vessel is navigating, the water current flowing along the stern 12 flows in the backward direction along the first hull bottom 21, and then flows to the second hull bottom 31, by which the hull surface pressure is increased and the stern 12 is pushed up by the hull surface pressure. Therefore, the immersion of the stern 12 is suppressed, and it is possible to reduce the vessel resistance. Furthermore, because the second hull bottom 31 is not inclined downward in the backward direction, the stern end 12a is hardly immersed in the water, and therefore it is also possible to reduce the vessel resistance in this aspect by suppressing generation of a stern wave by the second hull bottom 31.

Third Embodiment

Figure 8:
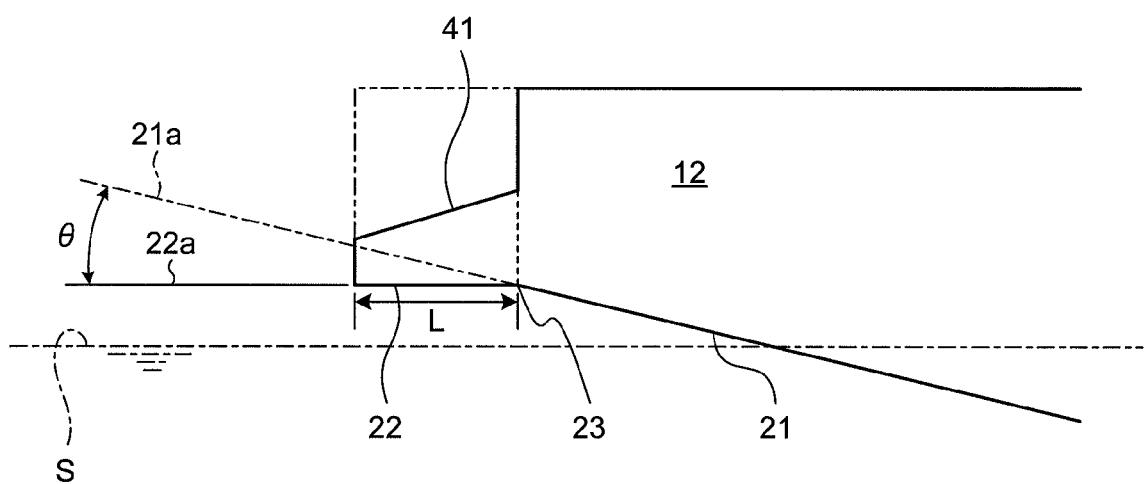
FIG. 8 is a side view of a stern shape of a vessel according to a third embodiment of the present invention.

FIG. 8 is a side view of a stern shape of a vessel according to a third embodiment of the present invention. Elements having functions that are identical to those described in the above embodiments are denoted by like reference signs and detailed explanations thereof will be omitted. Elements having functions that are identical to those described in the above embodiments are denoted by like reference signs and detailed explanations thereof will be omitted.

In the vessel according to the third embodiment, as shown in FIG. 8, the stern 12 includes the first hull bottom 21 formed with the hull bottom located at the centerline of the hull 11 in the width direction inclined upward in the backward direction and the second hull bottom 22 formed to make an angle equal to or larger than an angle parallel to the design draft S and equal to or smaller than an angle of the backward extending line from the first hull bottom 21 continuously to the first hull bottom 21 at a position moved forward by a predetermined distance set in advance from the stern end 12a.

Specifically, the first hull bottom 21 is a plane or a curved surface inclined upward by the predetermined angle $\theta$ with respect to the design draft S in the backward direction from the hull bottom 13. The second hull bottom 22 is a plane parallel to the design draft S, being connected to the first hull bottom 21 at the inflection position 23 that is moved forward by the predetermined distance L that is set in advance from the stern end 12a.

The stern 12 further includes a recessed portion 41 at an area facing the second hull bottom 22 in the upward direction. The recessed portion 41 is formed by cutting the end portion of the stern 12 in a vertical direction from above and cutting the end portion in a substantially horizontal direction from the rear side. In this case, the side wall of the recessed portion 41 can be formed in a vertical shape, an inclined shape, or a curved shape, and the bottom wall of the recessed portion 41 can be formed in an inclined shape, a level shape, or a curved shape.

In this manner, the vessel according to the third embodiment includes the first hull bottom 21 formed with the hull bottom 13 located at the centerline C of the hull 11 in the width direction inclined upward in the backward direction and the second hull bottom 22 formed continuously to the first hull bottom 21, being parallel to the design draft S, at a position moved forward by the predetermined distance L set in advance from the stern end 12a, and further includes the recessed portion 41 on the hull 11 facing the second hull bottom 22 in the upward direction.

Therefore, by eliminating a region that does not exert any influence on the propulsive performance of the hull 11, the vessel weight can be reduced without degrading the propulsive performance, and therefore it is possible to reduce the vessel resistance and to reduce the manufacturing cost at the same time.

Fourth Embodiment

Figure 9:
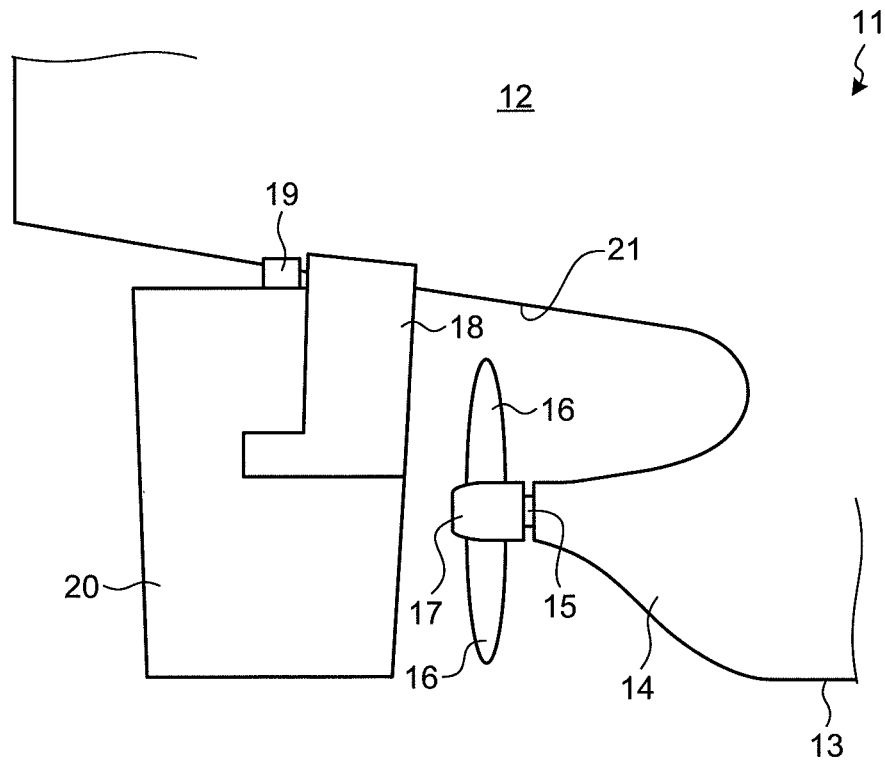
FIG. 9 is a side view of a stern shape of a vessel according to a fourth embodiment of the present invention.
Figure 10:
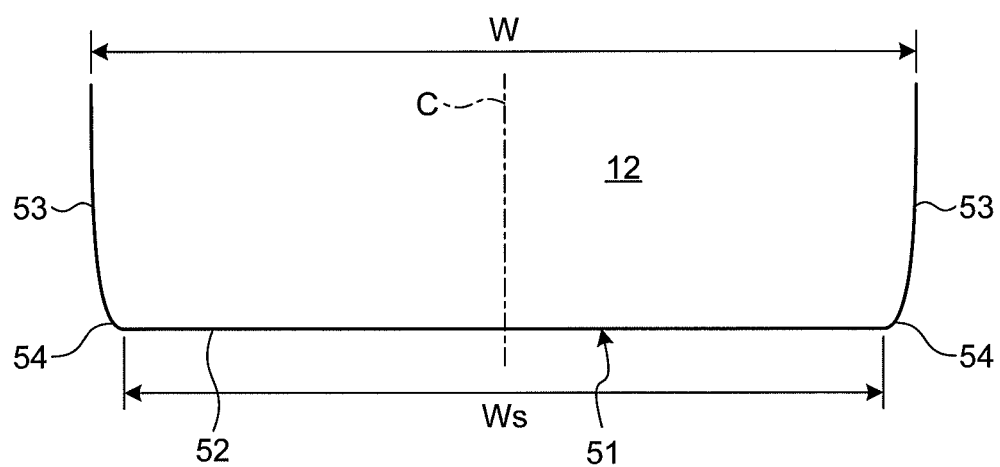
FIG. 10 is a front view of the stern shape of the vessel according to the fourth embodiment.
Figure 11:
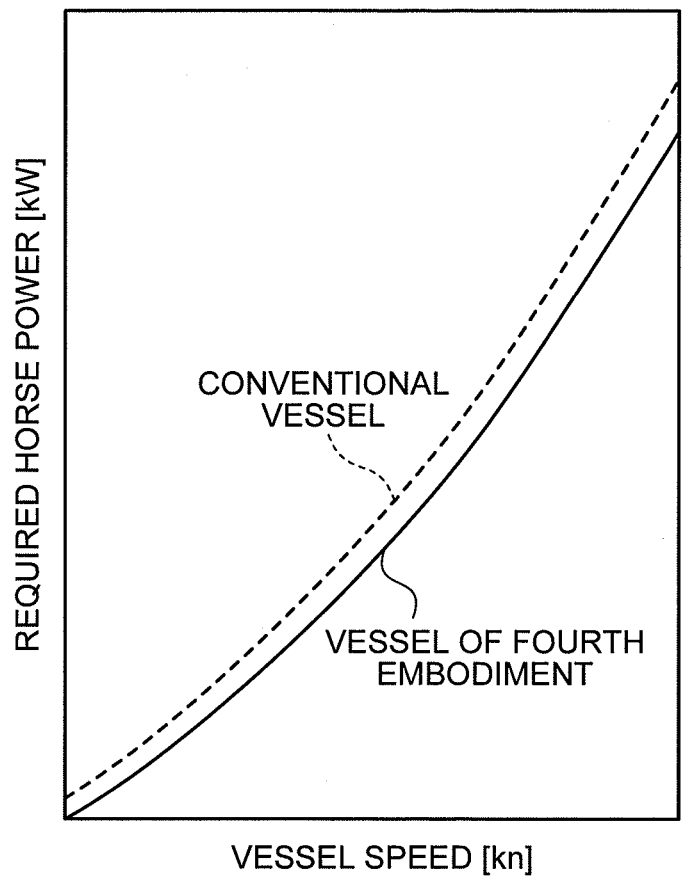
FIG. 11 is a graph of horse power with respect to a vessel speed.

FIG. 9 is a side view of a stern shape of a vessel according to a fourth embodiment of the present invention, FIG. 10 is a front view of the stern shape of the vessel according to the fourth embodiment, and FIG. 11 is a graph of horse power with respect to a vessel speed.

In the vessel according to the fourth embodiment, as shown in FIG. 9, the stern 12 of the hull 11 is formed such that the hull bottom 13 that is formed nearly level is extended backward, where the bearing unit 14 is formed. The main shaft 15 is rotatably supported by the bearing unit 14, and the propeller boss 17 including the screw propeller 16 is connected to a back end portion of the main shaft 15 in a fixed manner.

Furthermore, the hull bottom 13 is continuously formed above the propeller boss 17 in a smooth manner, the rudder horn 18 is fixed backward of the propeller boss 17, and the rudder 20 is supported by the rudderpost 19 that is installed on the stern 12 and the rudder horn 18.

In the vessel according to the fourth embodiment configured in the above manner, as shown in FIGS. 9 and 10, a stern hull bottom 51 that is continued from the hull bottom 13 in a smooth manner is formed on the stern of the hull 11, that is, the stern 12. The stern hull bottom 51 of the stern 12 is constituted by a level portion 52 that serves as a bottom portion, a side wall 53 on the left and right sides, and a curved portion 54 on the left and right sides, which connects each edge portion of the level portion 52 in the width direction and the bottom portion of each side wall 53. In this case, the level portion 52 is formed in a planar shape or a smooth curved shape in the longitudinal direction, and in a planar shape that forms a horizontal line shape in the lateral (vessel width) direction. Furthermore, the side wall 53 is formed in a planar shape of a smooth curved shape.

A width Ws of the level portion 52 in the stern hull bottom 51 is set equal to or larger than 60% of a width W of the stern 12 (the hull 11). It is preferable that the width Ws of the level portion 52 in the stern hull bottom 51 be set equal to or larger than 60% and equal to or smaller than 95% of the width W of the stern 12 (the hull 11). This limitation is based on a restriction on the manufacturing.

Therefore, when the vessel is navigating, if the water current flowing along the stern 12 reaches the level portion 52 of the stern hull bottom 51, the stern 12 is pushed up via the level portion 52, and the immersion of the stern 12 is reduced. As a result, it is possible to reduce the vessel resistance generated due to the immersion of the stern 12 considerably, which leads to an improvement of fuel efficiency.

Conventionally, because the hull bottom of the stern end 12a is curved in the width direction and an area of the level portion in the width direction is small, the stern end 12a becomes immersed in the water in an area in which the vessel speed is slow, resulting in a considerable increase of the resistance due to a stern wave generated at the stern. However, in the vessel according to the first embodiment, it is possible to accelerate the flow near the stern end 12a by increasing the area of the level portion 52 in the stern hull bottom 51 in the width direction, by which the immersion of the stern end 12a is virtually eliminated in the whole area from the high speed area to the low speed area, thereby reducing the vessel resistance.

Therefore, as shown in FIG. 3, the vessel according to the fourth embodiment (solid line) having a large width-direction area of the level portion 52 of the stern hull bottom 51 can reduce the required horse power with respect to the vessel speed, compared to a conventional vessel (dotted line) in which the hull bottom of the stern end 12a is curved in the width direction or the area of the level portion in the width direction is small.

In this manner, in the vessel according to the fourth embodiment, the stern 12 is constituted by the level portion 52 that serves as a bottom portion, the side wall 53 on the left and right sides, and the curved portion 54 on the left and right sides, which connects each edge portion of the level portion 52 in the width direction and the bottom portion of each side wall 53, and the width Ws of the level portion 52 in the stern hull bottom 51 is set equal to or larger than 60% of the width W of the stern 12 (the hull 11).

Therefore, when the vessel is navigating, the water current flowing along the stern 12 flows backward along the stern hull bottom 51, the hull surface pressure is increased due to the flow to the level portion 52 of the stern hull bottom 51, and the stern 12 is pushed up by the hull surface pressure. As a result, the immersion of the stern 12 is suppressed, and it is possible to reduce the vessel resistance.

Furthermore, in the vessel according to the fourth embodiment, the width Ws of the level portion 52 in the stern hull bottom 51 is set equal to or larger than 60% and equal to or smaller than 95% of the width W of the stern 12 (the hull 11).

Therefore, by setting the width of the level portion 52 to an optimum value, it is possible to further reduce the vessel resistance.

Fifth Embodiment

Figure 12:
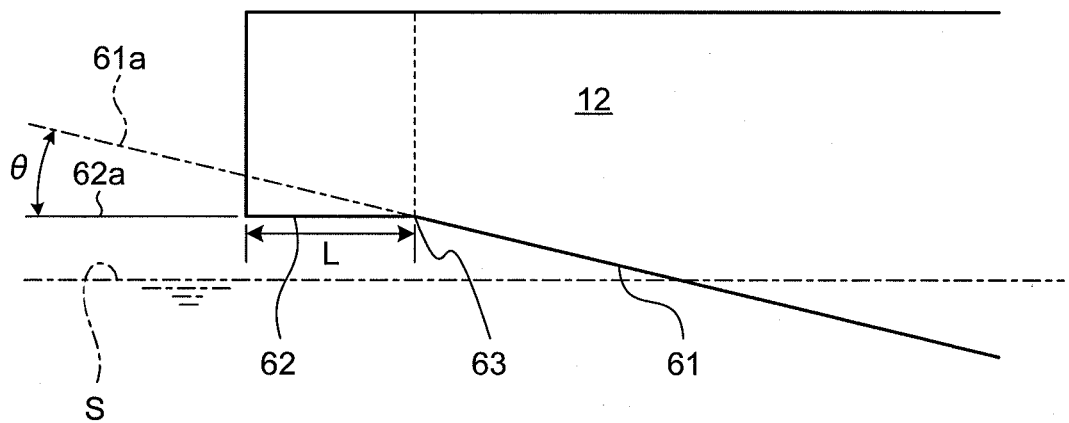
FIG. 12 is a side view of a stern shape of a vessel according to a fifth embodiment of the present invention.
Figure 13:
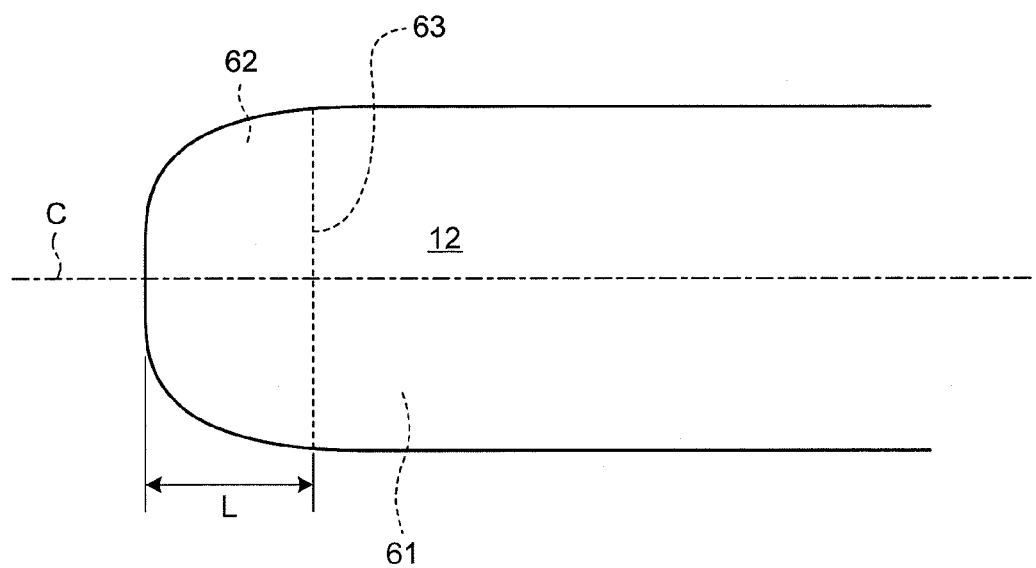
FIG. 13 is a plan view of the stern shape of the vessel according to the fifth embodiment.

FIG. 12 is a side view of a stern shape of a vessel according to a fifth embodiment of the present invention, and FIG. 13 is a plan view of the stern shape of the vessel according to the fifth embodiment. Elements having functions that are identical to those described in the above embodiments are denoted by like reference signs and detailed explanations thereof will be omitted.

In the vessel according to the fifth embodiment, as shown in FIGS. 12 and 13, the stern 12 includes a first hull bottom 61 formed with the hull bottom located at the centerline of the hull 11 in the width direction inclined upward in the backward direction and a second hull bottom 62 formed to make an angle equal to or larger than an angle parallel to the design draft S and equal to or smaller than an angle of a backward extending line from the first hull bottom 61 continuously to the first hull bottom 61 at a position moved forward by a predetermined distance set in advance from the stern end 12a.

In this case, it is preferable to set the angle of the second hull bottom 62 equal to or larger than 0 degrees and equal to or smaller than 20 degrees with respect to the design draft S. Furthermore, the first hull bottom 61 is in a virtually level planar shape or a smooth curved shape, while the second hull bottom 62 is in a shape that is level backward and forward in parallel to the design draft S. In addition, a continuous portion between the first hull bottom 61 and the second hull bottom 62 makes an inflection position 63 to generate a change of a flow field accompanying a change of the current speed.

That is, the vessel according to the fifth embodiment is a commercial vessel including a transom stern, in which the inflection point (inflection position) 63 to generate a change of a flow field accompanying a change of the current speed is provided at a position moved forward by a predetermined distance set in advance from the stern end 12a. The first hull bottom 61 is then formed while being inclined upward in the backward direction with a planar shape or a smooth curved shape such that an area in which the current speed is slow is formed forward from the inflection position 63. On the other hand, the second hull bottom 62 is formed at a position away from the stern end 12a by a predetermined distance being inclined downward in the backward direction to generate a downward flow to form an area in which the water flow is accelerated backward of the inflection position 63.

Specifically, the stern 12 makes a symmetric form with respect to the centerline C of the hull 11 in the width direction. The first hull bottom 61 is a plane or a curved surface inclined upward by the predetermined angle θ with respect to the design draft S in the backward direction from the hull bottom 13. The second hull bottom 62 is a level plane parallel to the design draft S, being connected to the first hull bottom 61 at the inflection position 63 that is moved forward by the predetermined distance L set in advance from the stern end 12a. In this case, because both sides of the stern end 12a are curved to be connected to the vessel side portions in a continuous manner, both sides of the inflection position 63 are also curved to be connected to the vessel side portions in a continuous manner along the shape of the stern end 12a.

Furthermore, the second hull bottom 62 is formed within an angle made by a level line 62a that is parallel to the design draft S and an extended line 61a that is extended backward from the first hull bottom 31, which is an inclination angle in the backward direction equal to or larger than 0 degrees on the upper side from the level line 62a and an inclination angle on the lower side from the extended line 61a. In this case, it is preferable to set the predetermined angle θ in such a manner that the upward inclination angle in the backward direction with respect to the design draft S is equal to or smaller than 20 degrees. The inflection position 63 is not necessarily to connect the first hull bottom 61 and the second hull bottom 62 with a predetermined angle, but it suffices that the inflection position 63 connects them in a smooth manner with a predetermined curved surface in the longitudinal direction. Furthermore, when the first hull bottom 61 is not a planar shape but is a smooth curved shape, the extended line 61a from the first hull bottom 61 is a tangential line of the first hull bottom 61 at the inflection position 63.

The design draft S is a draft in a state where a load of a predetermined weight is loaded on the hull 11, and a full load draft is a draft in a state where a load of the maximum weight that is tolerable by the structural strength is loaded on the hull 11. Therefore, the design draft S is set to allow a margin on the full load draft.

In the vessel according to the fifth embodiment, the stern hull bottom in the stern 12 is constituted by the first hull bottom 61 and the second hull bottom 62. The second hull bottom 62 of the stern 12 is constituted by the level portion 52, the side wall 53 on the left and right sides, and the curved portion 54 (see FIG. 10), which is similar to the fourth embodiment described above, and the width Ws of the level portion 52 of the second hull bottom 62 is set equal to or larger than 60% of the width W of the stern 12 (the hull 11).

Therefore, when the vessel is navigating, the water current flowing along the stern 12 is deflected in the downward direction at the rear side of the inflection position 63, by which the stern 12 is pushed up in the upward direction via the second hull bottom 62, so that the immersion of the stern 12 is reduced. As a result, it is possible to reduce the vessel resistance generated due to the immersion of the stern 12 considerably, which leads to an improvement of fuel efficiency.

Conventionally, because a hull bottom inclined downward in the backward direction is provided, in an area in which the vessel speed is slow, the stern end 12a is immersed in the water, and as a result, the resistance is increased considerably due to a wave generated at the stern. However, in the vessel according to the fifth embodiment, it is possible to secure a clearance with the water surface by leveling the second hull bottom 62, so that the stern end 12a is never immersed in the water across the whole area from the high-speed area to the low-speed area, thereby reducing the vessel resistance.

That is, when the vessel is navigating, the water current flowing along the stern 12 flows from the first hull bottom 61 that is inclined upward to the inflection position 63 side, and then flows from the inflection position 63 to the level portion 52 of the second hull bottom 62 that makes a level plane, by which the hull surface pressure is increased and the stern 12 is pushed up by the hull surface pressure. As a result, the immersion of the stern 12 is suppressed, and the vessel resistance is reduced.

In this case, if the load of the maximum weight is loaded on the vessel, the draft can be elevated up to the full load draft, and then the stern can be immersed in the water. Conventionally, because the stern bottom is inclined downward, the stern end 12a is easily immersed in the water, resulting in a considerable increase of the resistance because an excessive stern wave is generated from the stern end 12a that is immersed in the water. On the other hand, in the vessel according to the fifth embodiment, because the second hull bottom 62 makes a level plane in the longitudinal direction and in the width direction, the second hull bottom 62 is hardly immersed in the water, and even if it is immersed in the water, the amount of immersion is small. Therefore, generation of a stern wave is reduced, and an increase of the resistance is suppressed accordingly.

In this manner, the vessel according to the fifth embodiment includes the first hull bottom 61 formed with the hull bottom 13 located at the centerline C of the hull 11 in the width direction inclined upward in the backward direction and the second hull bottom 62 formed continuously to the first hull bottom 61, being parallel to the design draft S, at a position moved forward by the predetermined distance L set in advance from the stern end 12a, and the width Ws of the level portion 52 of the second hull bottom 62 is set equal to or larger than 60% of the width W of the stern 12.

Therefore, when the vessel is navigating, the water current flowing along the stern 12 flows in the backward direction along the first hull bottom 61, and then flows to the level portion 52 of the second hull bottom 62, by which the hull surface pressure is increased and the stern 12 is pushed up by the hull surface pressure. As a result, the immersion of the stern 12 is suppressed, and it is possible to reduce the vessel resistance. Furthermore, because the second hull bottom 62 is not inclined downward in the backward direction, the stern end 12a is hardly immersed in the water, and therefore it is also possible to reduce the vessel resistance in this aspect by suppressing generation of a stern wave by the stern end 12a of the second hull bottom 62.

In addition, in the vessel according to the fifth embodiment, the angle of the second hull bottom 62 is set equal to or larger than 0 degrees and equal to or smaller than 20 degrees with respect to the design draft S. Therefore, by setting the angle of the second hull bottom 62 to an appropriate angle with respect to the design draft S, it is possible to effectively reduce the vessel resistance with a push-up effect of the stern 12 by the hull surface pressure and a suppression effect of generation of a stern wave by the immersion of the stern end 12a of the second hull bottom 62.

Moreover, in the vessel according to the fifth embodiment, the first hull bottom 61 is formed in a planar shape or a curved shape, and the second hull bottom 62 is formed in a level shape in the longitudinal direction parallel to the design draft S. Therefore, by forming the entire hull bottom in a smooth shape, it is possible to further reduce the vessel resistance.

Furthermore, in the vessel according to the fifth embodiment, the continuous portion between the first hull bottom 61 and the second hull bottom 62 makes the inflection position 63 to generate a change of a flow field accompanying a change of the current speed. Therefore, by increasing the hull surface pressure on the forward side of the inflection position 63, it is possible to appropriately exert the push-up effect of the stern 12 by the hull surface pressure.

Sixth Embodiment

Figure 14:
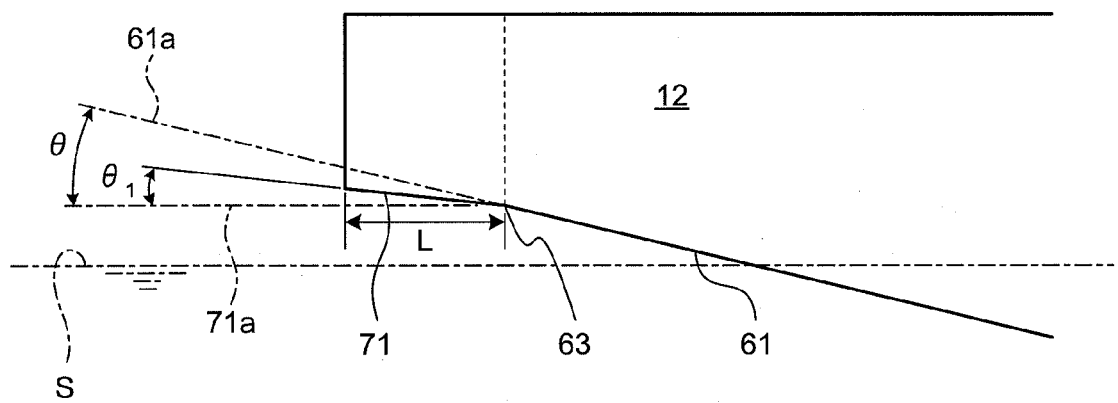
FIG. 14 is a side view of a stern shape of a vessel according to a sixth embodiment of the present invention.
Figure 15:
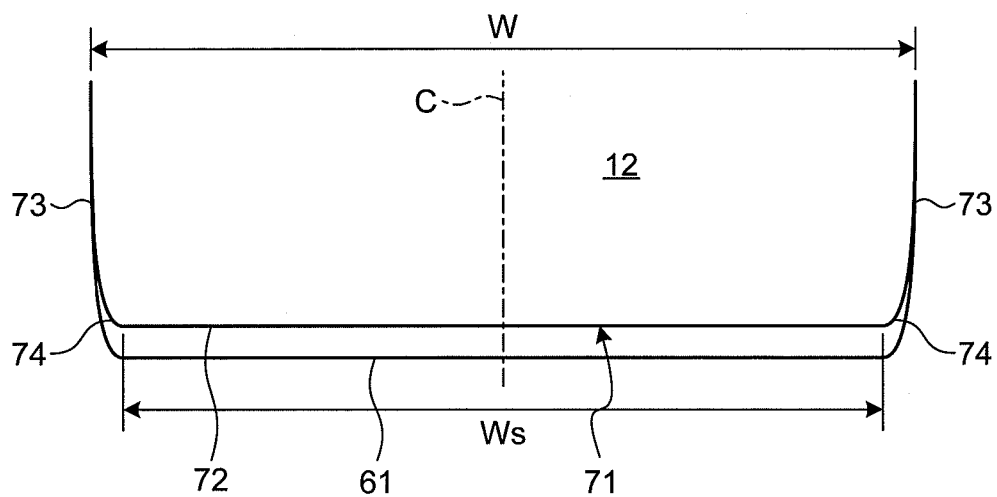
FIG. 15 is a front view of the stern shape of the vessel according to the sixth embodiment.

FIG. 14 is a side view of a stern shape of a vessel according to a sixth embodiment of the present invention, and FIG. 15 is a front view of the stern shape of the vessel according to the sixth embodiment. Elements having functions that are identical to those described in the above embodiments are denoted by like reference signs and detailed explanations thereof will be omitted.

In the vessel according to the sixth embodiment, as shown in FIGS. 14 and 15, the stern 12 includes the first hull bottom 61 formed with the hull bottom located at the centerline of the hull 11 in the width direction inclined upward in the backward direction and a second hull bottom 71 formed to make an angle equal to or larger than an angle parallel to the design draft S and equal to or smaller than an angle of the backward extending line from the first hull bottom 61 continuously to the first hull bottom 61 at a position moved forward by a predetermined distance set in advance from the stern end 12a.

Specifically, the first hull bottom 61 is a plane or a curved surface inclined upward by the predetermined angle θ with respect to the design draft S in the backward direction from the hull bottom 13. The second hull bottom 71 is a plane connected to the first hull bottom 61 at the inflection position 63 that is moved forward by the predetermined distance L that is set in advance from the stern end 12a, being inclined upward by the predetermined angle $θ_1$ with respect to the design draft S. In this case, the predetermined angle $θ_1$ of the second hull bottom 71 is smaller than the predetermined angle θ of the first hull bottom 61.

That is, the second hull bottom 71 is a plane formed within an angle made by a level line 71a that is parallel to the design draft S and the extended line 61a that is extended backward from the first hull bottom 61, having the predetermined angle $θ_1$ with respect to the level line 71a.

Furthermore, the stern hull bottom in the stern 12 is constituted by the first hull bottom 61 and the second hull bottom 71. The second hull bottom 71 of the stern 12 is constituted by a level portion 72, a side wall 73 on the left and right sides, and a curved portion 74, and the width Ws of the level portion 72 of the second hull bottom 71 is set equal to or larger than 60% of the width W of the stern 12 (the hull 11).

Therefore, when the vessel is navigating, the water current flowing along the stern 12 flows from the first hull bottom 61 that is inclined upward to the inflection position 63 side, and then flows from the inflection position 63 to the second hull bottom 71 that is inclined upward. In this case, because the predetermined angle $θ_1$ of the second hull bottom 71 is smaller than the predetermined angle θ of the first hull bottom 61, the hull surface pressure is increased and the stern 12 is pushed up by the hull surface pressure. As a result, the immersion of the stern 12 is suppressed, and the vessel resistance is reduced.

If a load of the maximum weight is loaded on the vessel, the draft is elevated up to the full load draft, and then the stern end 12a can be immersed in the water. However, because the second hull bottom 71 is inclined upward from the level plane, the stern end 12a of the second hull bottom 71 is hardly immersed in the water, and even if it is immersed in the water, the amount of immersion is small. Therefore, generation of a stern wave is reduced, and an increase of the resistance is suppressed accordingly.

In this manner, the vessel according to the sixth embodiment includes the first hull bottom 61 formed with the hull bottom 13 located at the centerline C of the hull 11 in the width direction inclined upward in the backward direction and the second hull bottom 71 formed to make the predetermined angle $θ_1$ equal to or smaller than the angle of the backward extending line from the first hull bottom 61 continuously to the first hull bottom 61 at a position moved forward by the predetermined distance L set in advance from the stern end 12a, and the width Ws of the level portion 72 of the second hull bottom 71 is set equal to or larger than 60% of the width W of the stern 12.

Therefore, when the vessel is navigating, the water current flowing along the stern 12 flows in the backward direction along the first hull bottom 61, and then flows to the level portion 72 of the second hull bottom 71, by which the hull surface pressure is increased and the stern 12 is pushed up by the hull surface pressure. Therefore, the immersion of the stern 12 is suppressed, and it is possible to reduce the vessel resistance. Furthermore, because the second hull bottom 71 is not inclined downward in the backward direction, it is hardly immersed in the water, and therefore it is also possible to reduce the vessel resistance in this aspect by suppressing generation of a stern wave by the stern end 12a of the second hull bottom 71.

Seventh Embodiment

Figure 16:
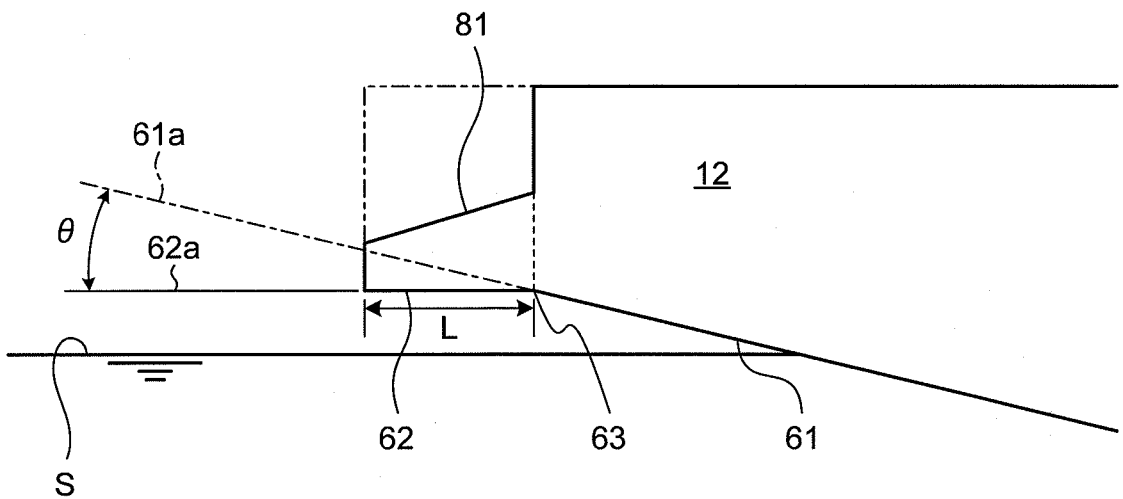
FIG. 16 is a side view of a stern shape of a vessel according to a seventh embodiment of the present invention.

FIG. 16 is a side view of a stern shape of a vessel according to a seventh embodiment of the present invention. Elements having functions that are identical to those described in the above embodiments are denoted by like reference signs and detailed explanations thereof will be omitted.

In the vessel according to the seventh embodiment, as shown in FIG. 16, the stern 12 includes the first hull bottom 61 formed with the hull bottom located at the centerline of the hull 11 in the width direction inclined upward in the backward direction and the second hull bottom 62 formed to make an angle equal to or larger than an angle parallel to the design draft S and equal to or smaller than an angle of the backward extending line from the first hull bottom 61 continuously to the first hull bottom 61 at a position moved forward by a predetermined distance set in advance from the stern end 12a.

Specifically, the first hull bottom 61 is a plane or a curved surface inclined upward by the predetermined angle θ with respect to the design draft S in the backward direction from the hull bottom 13. The second hull bottom 62 is a plane connected to the first hull bottom 61 at the inflection position 63 that is moved forward by the predetermined distance L that is set in advance from the stern end 12a, being parallel to the design draft S.

Furthermore, the stern hull bottom in the stern 12 is constituted by the first hull bottom 61 and the second hull bottom 62. The second hull bottom 62 of the stern 12 is constituted by the level portion 52, the side wall 53 on the left and right sides, and the curved portion 54 (see FIG. 10), which is similar to the fourth embodiment described above, and the width Ws of the level portion 52 of the second hull bottom 62 is set equal to or larger than 60% of the width W of the stern 12 (the hull 11).

The stern 12 further includes a recessed portion 81 at an area facing the second hull bottom 52 in the upward direction. The recessed portion 81 is formed by cutting the end portion of the stern 12 in a vertical direction from above and cutting the end portion in a substantially horizontal direction from the rear side. In this case, the side wall of the recessed portion 81 can be formed in a vertical shape, an inclined shape, or a curved shape, and the bottom wall of the recessed portion 51 can be formed in an inclined shape, a level shape, or a curved shape.

In this manner, the vessel according to the seventh embodiment includes the first hull bottom 61 formed with the hull bottom 13 located at the centerline C of the hull 11 in the width direction inclined upward in the backward direction and the second hull bottom 62 formed continuously to the first hull bottom 61, being parallel to the design draft S, at a position moved forward by the predetermined distance L set in advance from the stern end 12a, the width Ws of the level portion 52 in the second hull bottom 62 is set equal to or larger than 60% of the width W of the stern 12, and the vessel further includes the recessed portion 81 on the hull 11 facing the second hull bottom 62 in the upward direction.

Therefore, by eliminating a region that does not exert any influence on the propulsive performance of the hull 11, the vessel weight can be reduced without degrading the propulsive performance, and therefore it is possible to reduce the vessel resistance and to reduce the manufacturing cost at the same time.

In the above embodiments, the shape of the hull bottom in the stern is changed such that it is inclined upward in the backward direction with the predetermined angle θ, it is leveled along the way, or it is inclined to the angle $θ_1$. However, the shape is not limited to these configurations, and it can be inclined downward in the backward direction along the way as conventional techniques, the stern hull bottom itself can be leveled or inclined downward, or it can be a shape that is unleveled in the up-and-down direction and curved in the longitudinal direction. That is, regardless of the shape of the stern hull bottom, it suffices as far as the width of the level portion is set to a predetermined ratio.

Furthermore, the vessel according to the present invention is not limited to a single-screw vessel described in each of the embodiments, and can be applied to a multi-screw vessel (twin screws or more) or other propeller-equipped vessels (yawing-type POD propeller or azimuth propeller), from which operational effects identical to the above embodiments can be obtained.

INDUSTRIAL APPLICABILITY

The vessel according to the present invention can reduce the vessel resistance at the time of navigation by setting the width of the level portion in the hull bottom of the stern to a predetermined ratio, and can be applied to any type of vessel.

REFERENCE SIGNS LIST 11 hull
12 stern
12a stern end
13 hull bottom
21, 61 first hull bottom
22, 31, 62, 71 second hull bottom
23, 63 inflection position (inflection point)
41, 81 recessed portion
51 stern hull bottom
52, 72 level portion
53, 73 side wall
54, 74 curved portion

The invention claimed is:

1. A vessel comprising:
   a first hull bottom that is formed with a hull bottom located at a centerline of a hull in a width direction and inclined upward in a backward direction at a first angle to a design draft; and
   a second hull bottom that includes a planar surface being inclined upward in the backward direction at a second angle to the design draft, wherein
   the second angle is set to be smaller than the first angle and set larger than 0 degrees and equal to or smaller than 20 degrees with respect to the design draft,
   the first hull bottom and the second hull bottom are connected at an inflection position located behind a rudderpost at a predetermined angle,
   the inflection position generates a change of a flow field accompanying a change of a current speed, and
   the first hull bottom is disposed to cross the design draft and the second hull bottom is disposed above the design draft.

2. The vessel according to claim 1, wherein
   the first hull bottom has a planar shape or a smooth curved shape.

3. The vessel according to claim 1, wherein a recessed portion is provided in the hull at an area facing the second hull bottom in an upward direction.

4. The vessel according to claim 1, wherein
   a stern end of the hull is configured by connecting each bottom portion of left and right side walls and each edge portion of the hull bottom in the width direction with a curved portion, and
   a width of a level portion in the hull bottom is set equal to or larger than 60% of a width of the stern end.

5. The vessel according to claim 4, wherein the width of the level portion in the hull bottom is set equal to or larger than 60% and equal to or smaller than 95% of the width of the stern end of the hull.

6. The vessel according to claim 4, wherein the width of the level portion is set to a predetermined ratio of a width of the hull in the second hull bottom.

* * * * *